Figure 1:
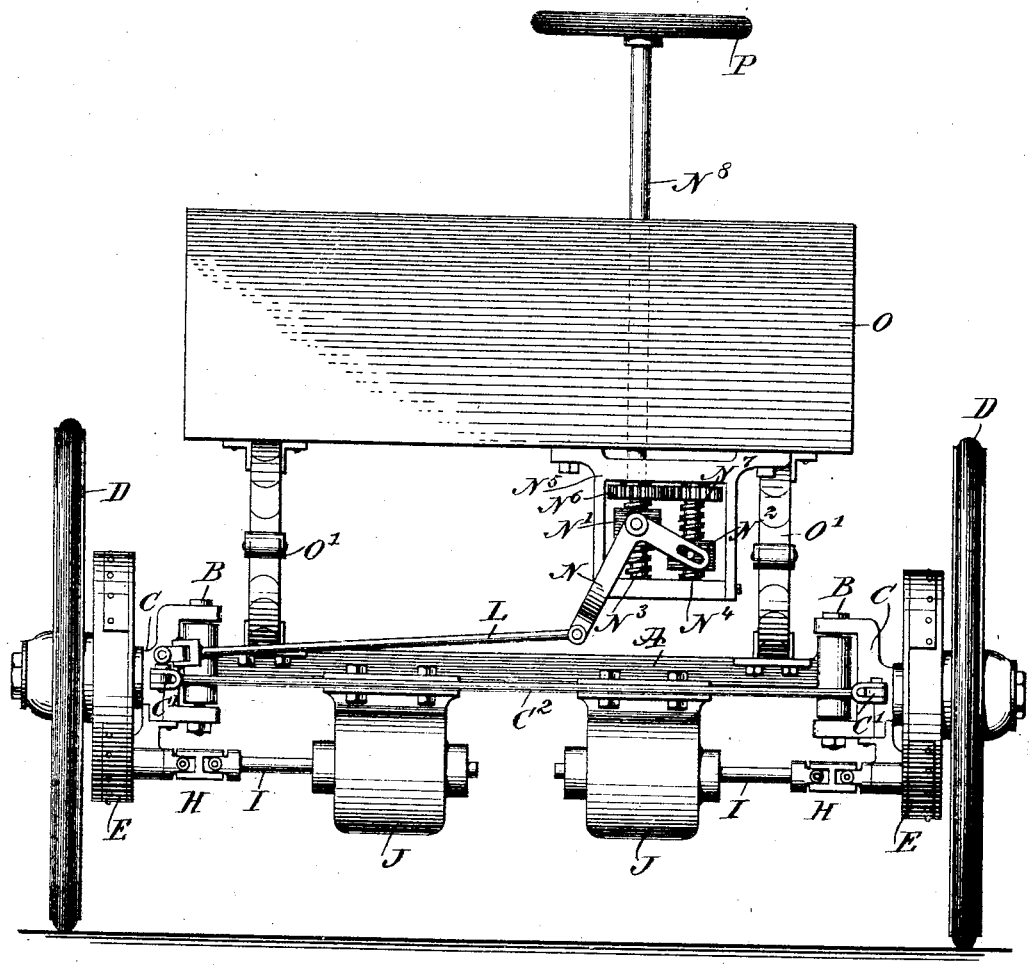

No. 779,351. PATENTED JAN. 3, 1905.
W. H. DOUGLAS.
DRIVING GEAR FOR MOTOR VEHICLES.
APPLICATION FILED FEB. 20, 1904.

2 SHEETS—SHEET 1.

WITNESSES:

INVENTOR
William H. Douglas
BY
ATTORNEYS

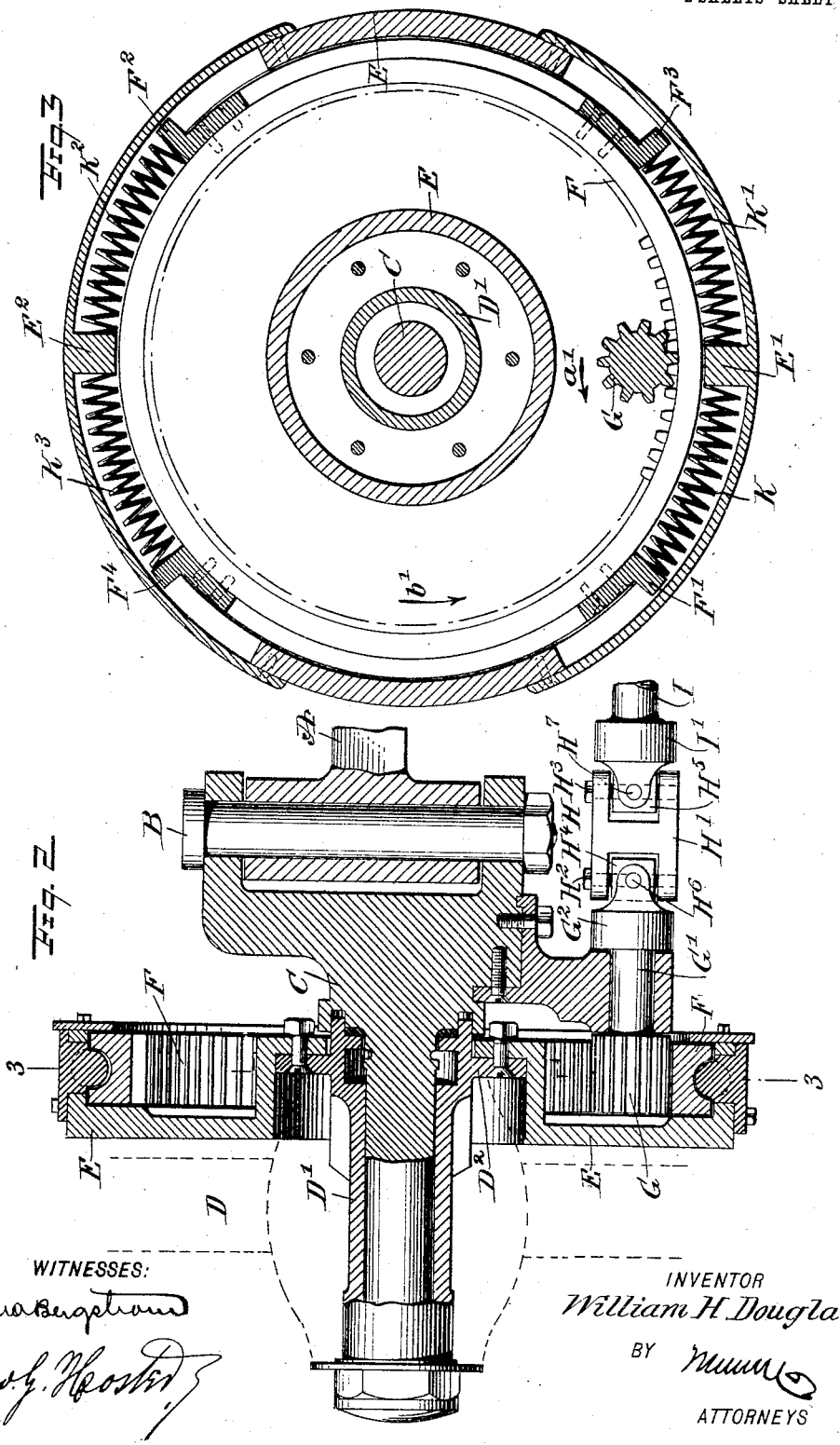

No. 779,351.

Patented January 3, 1905.

UNITED STATES PATENT OFFICE.

WILLIAM HENRY DOUGLAS, OF BELLEVILLE, NEW JERSEY, ASSIGNOR TO HEALEY & COMPANY, OF NEW YORK, N. Y., A CORPORATION OF NEW YORK.

DRIVING-GEAR FOR MOTOR-VEHICLES.

SPECIFICATION forming part of Letters Patent No. 779,351, dated January 3, 1905.

Application filed February 20, 1904. Serial No. 194,522.

*To all whom it may concern:*

Be it known that I, WILLIAM HENRY DOUGLAS, a citizen of the United States, and a resident of Belleville, in the county of Essex and State of New Jersey, have invented a new and Improved Driving-Gear for Motor-Vehicles, of which the following is a full, clear, and exact description.

The object of the invention is to provide a new and improved driving-gear, more especially designed for positively driving the steering-wheels of an automobile or other vehicle from motors carried directly on the axle for the steering-wheels.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a front elevation of the improvement as applied. Fig. 2 is an enlarged sectional front elevation of part of the same, and Fig. 3 is a sectional side elevation of the same on the line 3 3 of Fig. 2.

The ends of the steering-axle A of the motor-vehicle are connected by vertically-disposed pivots B with stub-axles C, on which are journaled wheels D, each of which is both a traction and steering wheel. On a flange $D^2$ of the skein $D'$ of each wheel D is secured a wheel-casing E, concentric to the wheel D, and in the said casing is mounted an internal gear-wheel F, in mesh with a pinion G, having its shaft $G'$ journaled in a suitable bearing secured to and depending from the corresponding stub-axle C. The inner end or head $G^2$ of the shaft $G'$ is connected by a universal joint H with the outer end or head $I'$ of the shaft I of a motor J, preferably an electric motor, and supported from the axle A.

By the arrangement described and shown in Fig. 1 an electric motor J is provided for each steering and traction wheel D, so as to rotate the latter—that is, to allow of driving both wheels D simultaneously from the two motors J or each independent of the other by running the motors J correspondingly, the motors being under the control of the operator in charge of the vehicle. Thus by driving both wheels D the vehicle is propelled forward, and by decreasing the speed of one or stopping it altogether and only driving the other the vehicle can be steered in the desired direction. When the motor is driven, then the rotary motion of its shaft I is transmitted by the universal joint H to the shaft $G'$, carrying the pinion G, so that the latter drives the internal gear-wheel F, and consequently the casing E and the wheel D, on which the casing is secured.

In order to easily start the rotation of the wheel D, the corresponding internal gear-wheel F is yieldingly mounted in its casing E, and for this purpose the internal gear-wheel F is provided with lugs $F' F^2$ and lugs $F^3 F^4$, and a spring K is interposed between the lug $F'$ and one face of a lug $E'$ on the casing, and a spring $K'$ is interposed between the other face of this lug $E'$ and the lug $F^3$, as plainly shown in Fig. 3. A spring $K^2$ is interposed between the lug $F^2$ and one face of a lug $E^2$, secured on the casing E, and a spring $K^3$ is interposed between the other face of this lug $E^2$ and the lug $F^4$. When the pinion G is rotated in the direction of the arrow $a'$, (see Fig. 3,) then the wheel F is rotated in the direction of the arrow $b'$, and consequently the lugs $F'$ and $F^2$ compress the springs K and $K^2$ until the compression overcomes the tractional resistance of the wheel D, after which the casing E is carried along by the internal gear-wheel F, and consequently the wheel D, to propel the vehicle forward. When the pinion G is rotated in the inverse direction of the arrow $a'$, then the internal gear-wheel F is rotated in the inverse direction of the arrow $b'$, and consequently the springs $K'$ and $K^3$ are first compressed until the tractional force of the wheel D is overcome, and then the internal gear-wheel F carries the casing E and the wheel D along to propel the vehicle in a rearward direction.

By the arrangement described the breaking of the teeth of the pinion G and the gear-wheel F is not liable to take place, especially as the transmission of power from the motor to the wheel D to be driven is gradual on starting the motor.

By the arrangement described the desired relation between the maximum speed of the motor and that desired in the wheel D is readily obtained, as the gearing is such that the motor J can be run at the usual high rate of speed; but the wheel D does not run at this speed, but at a considerably lower rate of speed.

In order to insure a proper transmission of power from the motor J to the wheel D irrespective of the angular position the latter may have to the axle A, it is desirable to construct the universal joint H as illustrated in the drawings—that is, to provide the universal joint H with a body member H', carrying pivot-pins $H^2$ and $H^3$, on which are mounted to turn blocks $H^4$ and $H^5$, connected by pivots $H^6$ and $H^7$ with the inner end $G^2$ of the shaft G' and the outer end I' of the corresponding motor-shaft I, the pivots $H^2$ $H^6$ and $H^3$ $H^7$ standing at right angles one to the other, as will be readily understood by reference to Fig. 2.

The axis of the pivot B extends centrally through the body member H', and when the stub-axle C is swung into an angular position relative to the axle A then the transmission of the power from the motor J to the gear-wheel F is not altered, as the body member H', having the independent connections with the shafts I and G', causes a uniform transmission of the rotation of the shaft I to the shaft G'.

The stub-axles C are connected with each other and with a suitable steering device, preferably, however, of the construction indicated in Fig. 1, and more particularly described in the application for Letters Patent of the United States for a steering device, filed by me under even date herewith. As shown in Fig. 1, the stub-axles C are provided with arms C', connected at one end by a link L with a lever N, the movement of which is controlled by nuts N' and $N^2$, adapted to travel in opposite directions on screw-rods $N^3$ and $N^4$, journaled in a suitable bracket $N^5$, attached to the under side of the vehicle-body O, connected by springs O' with the axle A. The screw-rods $N^3$ and $N^4$ are connected with each other by gear-wheels $N^6$ and $N^7$, and the screw-rod $N^3$ has an extension-rod $N^8$, carrying a steering-wheel P under the control of the operator in charge of the motor-vehicle. On turning the steering-wheel P a swinging motion is given simultaneously to the stub-axles C by the steering device mentioned, so as to steer the vehicle in the desired direction.

Having thus described my invention, I claim as new and desire to secure by Letters Patent—

1. In a motor-vehicle, the combination with an axle having pivoted stub-axles, and wheels journaled on the stub-axles, of an internal gear-wheel on each wheel, a pinion in mesh with the gear-wheel, a motor mounted on the said axle, and a universal joint between the shaft of the motor and the shaft of the said pinion, as set forth.

2. In a motor-vehicle, the combination with an axle having pivoted stub-axles, and wheels journaled on the stub-axles, of an internal gear-wheel on each wheel, a pinion in mesh with the gear-wheel, a motor mounted on the said axle, and a universal joint between the shaft of the motor and the shaft of the said pinion, the said universal joint having a body member and blocks pivoted thereon, one of the blocks being pivotally connected with the said motor-shaft and the other block being pivotally connected with the said pinion-shaft, as set forth.

3. In a motor-vehicle, the combination with an axle having pivoted stub-axles, and wheels journaled on the stub-axles, of a wheel-casing secured to the hub of each of the said wheels, an internal gear-wheel having a limited turning movement within the casing, springs for yieldingly connecting the internal gear-wheel with the said casing, a pinion in mesh with the gear-wheel, a motor mounted on the said axle, and a universal joint between the shaft of the motor and the shaft of the said pinion, as set forth.

4. In a motor-vehicle, the combination with a main axle provided with pivoted stub-axles and wheels journaled on the stub-axles, of motors attached to the main axle, and driving connections between the motors and wheels to rotate the wheels simultaneously, or one independent of the other, each of the said driving connections including a gearing for the corresponding wheel and a universal joint between the shaft of the motor and a shaft of the gearing.

In testimony whereof I have signed my name to this specification in the presence of two subscribing witnesses.

WILLIAM HENRY DOUGLAS.

Witnesses:
THEO. G. HOSTER,
EVERARD BOLTON MARSHALL.